United States Patent [19]

Hennings et al.

[11] 4,222,885

[45] Sep. 16, 1980

[54] METHOD OF PRODUCING A DIELECTRIC WITH PEROWSKITE STRUCTURE AND CONTAINING A COPPER OXIDE

[75] Inventors: Detlev Hennings; Herbert Schreinemacher, both of Aachen, Fed. Rep. of Germany

[73] Assignee: U.S. Philips Corporation, New York, N.Y.

[21] Appl. No.: 934,028

[22] Filed: Aug. 16, 1978
(Under 37 CFR 1.47)

[30] Foreign Application Priority Data

Aug. 16, 1977 [DE] Fed. Rep. of Germany ....... 2736688

[51] Int. Cl.$^2$ .............................................. H01B 3/12
[52] U.S. Cl. .................. 252/63.2; 106/39.5; 106/73.3; 106/73.31; 252/63.5
[58] Field of Search ............... 252/63.2, 63.5, 520, 252/521; 106/39.5, 73.3, 73.31; 361/321, 322

[56] References Cited

U.S. PATENT DOCUMENTS

| | | | |
|---|---|---|---|
| 3,441,517 | 4/1969 | Braver et al. ........................ | 252/520 |
| 3,473,958 | 10/1969 | Waku ............................ | 106/73.31 X |
| 3,490,887 | 1/1970 | Herczog et al. ................ | 252/63.5 X |
| 3,851,228 | 11/1974 | Sheard ............................ | 361/321 X |
| 3,977,887 | 8/1976 | McIntosh ..................... | 106/73.31 X |
| 4,143,207 | 3/1979 | Itakura et al. ................. | 106/73.3 X |

FOREIGN PATENT DOCUMENTS 2659016  6/1978  Fed. Rep. of Germany .

*Primary Examiner*—Harris A. Pitlick
*Attorney, Agent, or Firm*—Marc D. Schechter

[57] ABSTRACT

Method for producing a dielectric having perowskite structure comprising stoichiometric alkaline earth titanates, alkaline earth zirconates, alkaline earth stannates and mixed crystals thereof, wherein an admixture of eutectic-forming compounds which are capable of forming $CuO.MeO_x$ when sintered in an oxygen atmosphere, which cannot in practice be built into the perowskite lattice, are added to the stoichiometric perowskite structure and wherein the mixture of compounds is sintered at a partial oxygen pressure of 0.2 to 1 Bar in the temperature range from 1000°–1250° C., $MeO_x$ in the above-mentioned formula being the oxide of at least one element of group III, V, VI or VII of the Periodic System of Elements (P.S.E.).

4 Claims, No Drawings

METHOD OF PRODUCING A DIELECTRIC WITH PEROWSKITE STRUCTURE AND CONTAINING A COPPER OXIDE

BACKGROUND OF THE INVENTION

The invention relates to a method of producing a dielectric having a perowskite structure comprising perowskite-forming compounds consisting of stoichiometric alkaline earth titanates, alkaline earth zirconates, alkaline earth stannates and mixed crystals thereof, wherein an admixture of eutectic-forming compounds which in practice cannot be built into the perowskite lattice is added to the perowskite lattice, and wherein the mixture of compounds is sintered at a partial oxygen pressure from 0.2 to 1 Bar in the temperature range from 1000°–1250° C. Such a method is the subject of U.S. Pat. application Ser. No. 24,811 which is hereby incorporated by reference into the present specification.

The above-mentioned Patent Application describes a method for reducing the sintering temperature of alkaline earth titanates, -zirconates and -stannates or the mixed crystals thereof to such an extent that the physical and, particularly, the dielectric properties of the sintered bodies are maintained, but the manufacturing process for producing these sintered bodies becomes cheaper and simpler. This object is achieved by adding an admixture of eutectic-forming compounds which form $CuO.Cu_2O$ or $CuO.Cu_2O.Me^{IV}O_2$ when sintered in an oxygen atmosphere and which in practice cannot be built into the perowskite lattice of the stoichiometric perowskite compound, where $Me^{IV}O_2$ is at least an oxide of an element of group IV of the Periodic System of Elements, and by sintering the mixture of compounds at a partial oxygen pressure of 0.2 to 1 Bar in the temperature range from 1000°–1250° C.

As a rule, dense ceramics of barium titanate ($BaTiO_3$) and the mixed crystals thereof with other perowskites cannot be sintered below 1300° C. and in special cases only at approximately 1400° C. The low porosity of 3 to 5% and less, required for a dielectric ceramic, are reached at these high sintering temperatures only.

For dielectric ceramics the microstructure is, however, equally as important as the porosity. To obtain an optimal dielectric constant either a very fine-grained microstructure or a very coarse-grained micro-structure is required, depending on the material. Alternatively, it may be possible that, depending on the use, the same material is required in a coarse-grained as well as in a fine-grained microstructure. It is therefore very important that the grain growth can be influenced in a reliable manner to the one or the other direction. A pronounced grain growth is not observed except at elevated temperatures. For example, with undoped barium titanate ($BaTiO_3$), that is to say pure barium titanate, and the mixed crystals thereof, a coarse-grained microstructure is not obtained until after the addition of a slight excess of $TiO_2$ above a sintering temperature of approximately 1320° C. Small deviations of this approximate value are met in starting materials of a technical purity.

SUMMARY OF THE INVENTION

It is an object of the invention to provide oxide mixtures in which, at lower sintering temperatures than known for pure perowskite ceramics, microstructures can be obtained which are advantageous for achieving a high dielectric constant with a lowest possible temperature coefficient and which have a very high density.

In accordance with the invention this is accomplished by the addition of $CuO.MeO_x$-forming compounds, where $MeO_x$ is the oxide of at least one element of group III, V, VI or VII of the Periodic System of Elements (P.S.E.).

In addition to the advantages described in the prior patent application of the addition of a eutectic mixture, such as the reduction of the sintering temperature, this furnishes the additional advantage that the dielectric losses of the material to be sintered can be noticably reduced.

The grain growth can be influenced in a particularly advantageous manner by means of the above-mentioned admixtures. By impregnating calcined perowskite materials with $CuO.MeO_x$-admixtures the point at which the grain growth of the barium titanate ($BaTiO_3$) begins can be shifted to considerably lower temperature ranges than usual with pure perowskite materials. It is assumed that the considerable grain growth, in dependence on the uniformity of impregnation and the distribution of other contaminants, starts according to a statistical at random operating nucleating mechanism.

Depending on the type of $CuO.MeO_x$ admixture and the sintering atmosphere (air or oxygen), the temperatures for the beginning and for the end of the considerable grain growth can be drastically reduced. Materials containing tin, zirconium or hafnium, $CuO.SnO_2$, $CuO.ZrO_2$ and $CuO.HfO_2$ induce a very pronounced grain growth.

When the eutectic-forming oxide mixtures $CuO.Tl_2O_3.MnO_2$ are added, a special advantage is obtained (and greatly different ratios of mix of the said oxides are involved) that in the process, the sintering stage and the stage at which the grain growth starts can be separated, so that grain growth can be avoided to a great extent in spite of a low sintering temperature.

DESCRIPTION OF THE PREFERRED EMBODIMENTS

The invention will now be further explained with reference to some embodiments.

The effect of the different admixtures was measured by means of a dilatometer by measuring the shrinkage of mechanically and hydrostatically pre-densified bodies of pressed powder. The sample bodies were prismatic of shape, their dimensions were approximately 6.5×6.5×17 mm. The samples were heated in the dilatometer in air at a rate of approximately 4° C./minute to a maximum temperature of 1185° C. The density of the samples was determined from these measurements, in a percentage figure of the theoretical density ($\rho_{th}$) as a function of the temperature. The final density of the samples ($\rho_E$) was determined by measuring the hydrostatic upward pressure in water, in so far as these samples had a closed porosity. The final density of samples having an open porosity was, in contrast, determined by measuring the geometrical dimensions and the weight. Tables 1 and 2 show the results of these measurements.

The following, analytically pure, starting materials were used to produce sample bodies of titanates with the desired admixtures:

$BaCO_3$,
$TiO_2$,
$B_2O_3$,
$Al_2O_3$,
$Ga_2O_3$, $Tl_2O_3$,
$MnO_2$,
$V_2O_5$,
$Cr_2O_3$,
$Bi_2O_3$,
$Sb_2O_3$,

When starting materials of a technical purity are used, the quantities of the admixtures and the ratios of mix of the relevant oxides must be adapted in a suitable manner to arrive at the results according to the invention.

The required weighed-in quantities of the starting material for forming the perowskite ceramics, for example barium titante ($BaTiO_3$), were transferred to agate ball jars and stirred with denaturated ethanol into a slurry. A suitable number of agate balls were added, whereafter the slurry was mixed for two hours in a planetary ball mill. The mixtures were thereafter dried and calcined in air for 15 hours. The calcining temperature was 150° C.

After a dry mixing operation for 1 hour in a planetary ball mill, copper and an element from group III, V, VI or VII of the Periodic System of Elements were added in the form of the corresponding oxide. The procedure was as follows:

The calcined and ground perowskite material was mixed with the oxides to be added, in the same manner as the weighed-in quantities of starting material prior to the calcining process. After having been dried under a surface evaporator, the mixture was dry-milled for another 15 minutes in planetary a ball mill.

The ceramic powders thus prepared were pressed into sample bodies at a pressure of 4000 Bar, whereafter these bodies were sintered under the conditions specified in the tables 1 and 2. Table 1 shows the reduction in the sintering temperature of barium titanate (without admixtures >1300° C.) after an admixture of oxides, defined by the general composition $CuO.MeO_x$. The sintering atmosphere was air, the partial oxygen pressure was approximately 0.2 Bar. The heating-up rate was 3.9° C./minute and the sintering time at the maximum temperature was 200 minutes, this isothermal sintering taking place at 1185° C. (=maximum temperature). The rate of cooling was 3.9° C./minute.

TABLE 1

| (1) Admixture mole % | (2) The final density was reached in the heating-up phase at: | (3) The final density was reached in the isothermal phase after: | (4) Final density in % $\delta_E$ of $\delta_{th}$ |
|---|---|---|---|
| 1% CuO + 1% $BO_{1.5}$ | — | 30 min | 98.1 |
| 1% CuO + 1% $AlO_{1.5}$ | 1140° C. | 0 min | 98.0 |
| 1% CuO + 1% $GaO_{1.5}$ | 1130° C. | 0 min | 98.8 |

TABLE 1-continued

| (1) Admixture mole % | (2) The final density was reached in the heating-up phase at: | (3) The final density was reached in the isothermal phase after: | (4) Final density in % $\delta_E$ of $\delta_{th}$ |
|---|---|---|---|
| 1% CuO + 1% $TlO_{1.5}$ | — | 20 min | 99.7 |
| 1% CuO + 1% $InO_{1.5}$ | — | — | 74.6 |

Table 2 shows the reduction in the sintering temperature of barium titanate ceramic after an admixture of an oxide mixture of the general composition $CuO.MeO_x$. The sintering atmosphere was air, the partial oxygen pressure approximately 0.2 Bar. The heating-up rate was 3.9° C./minute and the sintering time at the maximum temperature was 200 minutes, with isothermal sintering taking place at 1185° C. (=maximum temperature).

The rate of cooling was 3.9° C./minute.

TABLE 2

| (1) Admixture mole % | (2) The final density is reached in the heating-up phase at: | (3) The final density is reached in the heating-up phase after: | (4) Final density in % $\delta_E$ of $\delta_{th}$: |
|---|---|---|---|
| 1% CuO + 1% $VO_{2.5}$ | 1185° C. | 0 min | 98.2 |
| 1% CuO + 1% $CrO_{1.5}$ | 1160° C. | 0 min | 98.0 |
| 1% CuO + 1% $MnO_2$ | — | 15 min | 97.5 |
| 1% CuO + 1% $BiO_{1.5}$ | 1170° C. | 0 min | 97.3 |
| 1% CuO + 1% $SbO_{1.5}$ | — | 45 min | 97.3 |

The values in tables 1 and 2 show that an admixture of copper oxide and oxides of the elements of group III, V, VI or VII of the Periodic System of Elements to perowskite ceramics comprising stoichiometric barium titanate results in a considerable reduction in the sintering temperature while, as a rule, the dielectric properties of these materials are not affected in a negative sense but in some cases even in a positive sense.

Table 3 shows the values for the dielectric properties of barium titanate ($BaTiO_3$) with the admixtures specified in Tables 1 and 2. The relative dielectric constant $\epsilon$ and the loss angle tan $\rho$ were measured in the temperature range from −20° C. to +85° C. with an a.c. voltage of 1 V (r.m.s.) using a frequency of 1 kHz at disc-shaped samples having a diameter of 5 mm and a thickness of 0.5 mm, these discs having been cut from sintered prismatic ceramic blocs. The electrodes consisted of vacuum-deposited chromium-nickel layers covered with gold layers.

TABLE 3

| (1) Admixture mole % | (2) Sintering temp. (°C.) Sintering time (h) | (3) average grain size/grain size range | (4) dielectr. properties (a) $\epsilon$, (b) tan $\delta$ (%) | −20° C. | 0° C. | +20° C. | 50° C. | 85° C. |
|---|---|---|---|---|---|---|---|---|
| — | 1320, 4 | ~30 | (a): | 1600 | 2500 | 2600 | 2300 | 2400 |
|  |  |  | (b): | 2.5 | 2.7 | 1.1 | 1.2 | 2.1 |
| 1% CuO + 1% $VO_{2.5}$ | 1185, 3 | 2–50 | (a): | 2300 | 2760 | 3000 | 2700 | 2450 |
|  |  |  | (b): | 2.2 | 2.2 | 1.5 | 0.8 | 0.6 |
| 1% CuO + 1% $CrO_{1.5}$ | 1185, 3 | 2–70 | (a): | 1100 | 1900 | 1700 | 1600 | 1700 |
|  |  |  | (b): | 1.3 | 1.3 | 1.0 | 1.0 | 1.0 |
| 1% CuO + 1% $MnO_2$ | 1185, 3 | 1–2 | (a): | 1960 | 2630 | 2680 | 2680 | 3800 |
|  |  |  | (b): | 2.0 | 2.4 | 2.4 | 2.0 | 2.3 |
| 1% CuO | 1185, | 2–50 | (a): | 2600 | 3000 | 3200 | 2900 | 2850 |

TABLE 3-continued

| (1) Admixture mole % | (2) Sintering temp. (°C.) Sintering time (h) | (3) average grain size/grain size range | (4) dielectr. properties (a) $\epsilon$, (b) tan $\delta$ (%) | −20° C. | 0° C. | +20° C. | 50° C. | 85° C. |
|---|---|---|---|---|---|---|---|---|
| + 1% BiO$_{1.5}$ | 3 | | (b): | 2.3 | 2.0 | 2.2 | 2.3 | 2.4 |
| 1% CuO | 1185, | 2–80 | (a): | 2400 | 2900 | 3100 | 2800 | 2700 |
| + 1% SbO$_{1.5}$ | 3 | | (b): | 1.0 | 1.0 | 1.4 | 1.4 | 1.2 |
| 1% CuO | 1185, | 2–30 | (a): | 2400 | 2900 | 3000 | 2700 | 2630 |
| + 1% SbO$_{1.5}$ | 3 | | (b): | 1.9 | 1.7 | 1.2 | 0.6 | 0.3 |
| 1% CuO | 1185, | ~12 | (a): | 2450 | 3430 | 2900 | 2230 | 1960 |
| + 1% AlO$_{1.5}$ | 3 | | (b): | 3.9 | 2.4 | 1.3 | 0.5 | 0.2 |
| 1% CuO | 1185, | ~2 | (a): | 1900 | 2230 | 2450 | 2450 | 2630 |
| + 1% GaO$_{1.5}$ | 3 | | (b): | 4.0 | 4.7 | 4.6 | 3.5 | 3.5 |
| 1% CuO | 1185, | 1–2 | (a): | 2360 | 2720 | 2230 | 1780 | 1740 |
| + 1% TlO$_{1.5}$ | 3 | | (b): | 3.6 | 1.8 | 0.8 | 0.4 | 0.4 |

The addition of CuO.TlO$_{1.5}$, CuO.AlO$_{1.5}$, CuO.CrO$_{1.5}$ and CuO.SbO$_{1.5}$ appeared to be especially advantageous in reducing the dielectric losses of barium titanate (BaTiO$_3$).

The advantageous values shown in tables 1 to 3 for barium titanate ceramic with an admixture of CuO.MeO$_x$ can be achieved with equal success for strontium titanate, calcium titanate, barium stannate, barium zirconate, calcium zirconate or the mixed crystals thereof. This is evidenced by the very similar properties of these perowskite ceramics, which were thoroughly examined and described in detail in the above referenced U.S. application.

What is claimed is:

1. A method of producing a dielectric material comprising perowskite-forming compounds consisting essentially of one or more of the group of stoichiometric alkaline earth titanates, alkaline earth zirconates, alkaline earth stannates and mixed crystals thereof, said method comprising the steps of:

admixing, with said perowskite-forming compounds, a quantity of eutectic-forming compounds which cannot be incorporated into the perowskite lattice to any substantial extent and which are capable of forming CuO.MeO$_x$ when sintered in an oxygen atmosphere, where MeO$_x$ is at least one oxide of an element from group III, V, VI or VII of the periodic system of element; and sintering said admixture, at a partial oxygen pressure of 0.2–1 Bar, in the temperature range of from 1000°–1250° C., said eutectic-forming compounds being present in sintering temperature lowering amounts.

2. A method as claimed in claim 1, wherein the CuO-forming compounds and the MeO$_x$-forming compounds are added in a molar ratio of 1:1.

3. A method as claimed in claim 1, further comprising the step of calcining the perowskite-forming compounds at a temperature of approximately 1150° C., prior to the step of admixing said perowskite-forming compounds with the eutectic-forming compounds.

4. A method as claimed in claim 1, 2, or 3, wherein MeO$_x$ is at least one oxide of an element from the group consisting essentially of boron, aluminum, gallium, thallium, vanadium, bismuth, antimony, chromium and manganese.

* * * * *